US008351931B2

(12) United States Patent
Yang et al.

(10) Patent No.: US 8,351,931 B2
(45) Date of Patent: Jan. 8, 2013

(54) ROAMING RETRYING METHOD UNDER PRE-PAGING MODE

(75) Inventors: Bo Yang, Shenzhen (CN); Yazhou Kong, Shenzhen (CN)

(73) Assignee: ZTE Corporation (CN)

( * ) Notice: Subject to any disclaimer, the term of this patent is extended or adjusted under 35 U.S.C. 154(b) by 291 days.

(21) Appl. No.: 12/994,955

(22) PCT Filed: Sep. 11, 2008

(86) PCT No.: PCT/CN2008/072330
§ 371 (c)(1),
(2), (4) Date: Nov. 29, 2010

(87) PCT Pub. No.: WO2009/143681
PCT Pub. Date: Dec. 3, 2009

(65) Prior Publication Data
US 2011/0081907 A1    Apr. 7, 2011

(30) Foreign Application Priority Data
May 28, 2008    (CN) .......................... 2008 1 0100191

(51) Int. Cl.
*H04W 4/00*    (2009.01)
(52) U.S. Cl. .................. 455/432.1; 455/432.3; 455/433; 455/435.1
(58) Field of Classification Search .... 455/432.1–432.3, 455/435.1–435.3, 433–434, 436–445, 450, 455/452.1–452.2, 466, 456.1–456.3, 456.5–456.6, 455/512–514, 552.1, 560–561; 370/230, 370/231, 252–253, 310, 313, 328–329, 334, 370/341, 400–401, 911, 912–913; 705/77–79
See application file for complete search history.

(56) References Cited

U.S. PATENT DOCUMENTS
5,884,179 A * 3/1999 Patel ............................ 455/445
(Continued)

FOREIGN PATENT DOCUMENTS
| CN | 1516516 A | 7/2004 |
| CN | 1585558 A | 2/2005 |
| WO | 02/01903 A1 | 1/2002 |
| WO | 2008033951 A2 | 3/2008 |

OTHER PUBLICATIONS

GSM Global System for Mobile Communications, Digital cellular telecommnications system (Phase 2+); Universal Mobile Telecommunications System (UMTS); Basic call handling; Technical realization (3GPP TS 23.018 version 7.6.0 Release 7). (Oct. 2007) Technical Specification—281 Pages.
Change Request 23.018 CR 0157 rev 4 Current Version: 7.4.0, C4-070777 Revision of C4-070632, 3GPP TSG CT WG4 Meeting #35, Beijing, China May 7-11, 2007.

(Continued)

*Primary Examiner* — Meless Zewdu
(74) *Attorney, Agent, or Firm* — Brooks Kushman P.C.

(57) ABSTRACT

The present invention provides a method for roaming retry under pre-paging mode. The method comprises the following steps of: during a pre-paging period, a called Mobile Station (MS) moving to a new location area and sending a location update request to a new Visitor Mobile Switching Center/Visitor Location Register (New VMSC/VLR); after receiving the location update request, the New VMSC/VLR sending a location area update message to a Home Location Register (HLR); after receiving the location area update message, the HLR sending a Send Routing Information (SRI) Ack message including a Roaming Retry Indication identifier to a to a Gateway Mobile Switching Center (GMSC); after receiving the SRI Ack message, the GMSC triggering a roaming retry procedure according to the Roaming Retry Indication identifier, and completing the subsequent calling flow.

15 Claims, 4 Drawing Sheets

U.S. PATENT DOCUMENTS

| | | | |
|---|---|---|---|
| 5,943,619 A * | 8/1999 | Coyne et al. | 455/433 |
| 5,991,621 A * | 11/1999 | Alperovich | 455/433 |
| 6,157,832 A * | 12/2000 | Lahtinen | 455/433 |
| 6,330,444 B1 * | 12/2001 | Rune et al. | 455/433 |
| 7,155,220 B2 * | 12/2006 | Hazelwood | 455/433 |
| 7,330,728 B1 * | 2/2008 | Moll et al. | 455/456.3 |
| 7,613,454 B2 * | 11/2009 | Zhang | 455/432.1 |
| 2006/0291418 A1 * | 12/2006 | Singh | 370/331 |
| 2007/0232280 A1 * | 10/2007 | Pruser et al. | 455/414.1 |
| 2008/0139202 A1 * | 6/2008 | Wang et al. | 455/432.1 |

OTHER PUBLICATIONS

Change Request 23.018 CR 0167 rev 1 Current Version 8.2.0, C4-094137 was C4-093689, 3GPP TSC CT4 Meeting #47, Beijing, People's Republic of China, Nov. 9-13, 2009.

Change Request 23.018 CR 0167 rev 4 Current Version 9.0.0, C4-100889 was C4-100352, #GPP TSG CT4 Meeing #48, San Francisco, US Feb. 22-26, 2010.

* cited by examiner

ROAMING RETRYING METHOD UNDER PRE-PAGING MODE

TECHNICAL FIELD

The present invention relates to the mobile communication field, and in particular, to a method for supporting Roaming Retry function under pre-paging mode.

BACKGROUND ART

As is well known, the core network of 3G (The Third Generation Mobile Communication Technology) is composed of a MSC (Mobile Switching Center), a VLR (Visitor Location Register), a HLR (Home Location Register) and a RNC (Radio Network Controller), wherein MSC can be divided according to functions into GMSC (Gateway Mobile Switching Center), which is a MSC responsible for inquiring the routing information of the called subscriber, and VMSC (Visitor Mobile Switching Center), which is a visited MSC of the subscriber and also a destination to be routed by a call; VLR is a visitor location register of a subscriber, HLR is a home location register of a subscriber, and RNC is a network element responsible for implementing the function of subscriber wireless access.

Pre-paging means that a GMSC will firstly send a Send Routing Information (SRI) message to a HLR when inquiring routing, and then the HLR will send a Provide Roaming Number (PRN) message to a VLR where the called subscriber is located; after receiving the PRN message, the VLR where the called subscriber is located will check the parameters in the message, and will return a PRN RSP (response) message to the HLR after pre-paging is over if the message requests the VLR where the called subscriber is located to start a pre-paging procedure, and the HLR will return a SRI RSP message to the GMSC; at this moment, the procedure of pre-paging is completely finished.

Roaming Retry is a technique adopted to solve the problem of call failure that occurs when a terminal subscriber is called while the subscriber moves out from the current location area; since it may take a period of time from when the HLR acquires the roaming number by inquiring the VMSC of the called subscriber to when the VMSC where the subscriber is located receives an IAM (Initial Address Message) sent by the GMSC, a subscriber which is of high mobility and meanwhile is on the border of a location area may move into another location area; this technique is favourable to improving probability of call success for a subscriber of high mobility.

The flow of the existing roaming retry technique is as shown in FIG. 1:

Step 101: firstly a GMSC sending a SRI message carrying a Roaming Retry Support identifier to a HLR;

Step 102: then the HLR forwarding a PRN message carrying a Roaming Retry Support identifier to an Old VMSC/VLR for requesting for a roaming number;

The above SRI and PRN messages include a pre-paging support indication field;

Step 103: the Old VMSC/VLR returning a PRN ACK message carrying a Mobile Station Roaming Number (MSRN) to the HLR;

Step 104: the HLR returning a SRI ACK message carrying the MSRN to the GMSC;

Step 105: the GMSC sending an Initial Address Message (IAM) to the Old VMSC;

Step 106: after receiving the IAM message, the Old VMSC/VLR initiating a paging;

Step 107: the subscriber moving at this moment, initiating a procedure for location update under a new VMSC, and a MS (Mobile Station) sending a Location Update request to the new VMSC/VLR;

Step 108: the new VMSC sending an update location request to the HLR;

Step 109: at this moment, the HLR sending a Cancel Location message to the Old VMSC, then the Old VMSC returning a Cancel Location Ack to the HLR.

Step 110: upon receiving the Cancel Location message, the Old VMSC firstly stopping a paging timer to cancel paging since paging is still performed at this moment, and notifying the GMSC to perform roaming retry through step 111; meanwhile the new VMSC/VLR starting the procedure of inserting subscriber data;

Step 111: the Old VMSC/VLR sending a RCH (Resume Call Handling) message carrying a roaming retry indication identifier to notify the GMSC to perform roaming retry;

Step 112: the GMSC releasing the call to the Old VMSC/VLR using a REL/RLC message (a releasing message of ISUP, corresponding to the IAM message);

Step 113: after receiving the RCH message, the GMSC initiating a procedure of obtaining the roaming number for the second time at this moment, which is called as roaming retry, wherein the SRI message sent for the second time does not include Roaming Retry Support identifier any more;

Step 114: after completing location update, the HLR postponing sending the PRN to the new VMSC/VLR;

Step 115: after receiving the PRN ACK sent by the NEW VMSC/VLR, the HLR returning a SRI ACK message containing MSRN' (a new mobile station roaming number) to the GMSC;

Step 116: the GMSC sending an Initial Address Message (IAM) to the NEW VMSC/VLR using this MSRN';

Step 117: after completing location update, the NEW VMSC/VLR initiating a paging procedure.

Processing of normal MT (Mobile Terminated) call procedure will be performed subsequently.

As can be seen from the flow and various protocol files described specifically above, in the current method for triggering roaming retry, if the subscriber starts pre-paging when the Old MSC/VLR receives SRI/PRN for the first time, the PRN procedure will fail directly if processing is carried out according to the previous protocol when the subscriber moves during pre-paging and receives a Cancel Location message; in step 103, a PRN ACK message carrying an error indication is sent to the HLR, and roaming retry is not taken into consideration if a Cancel Location is received during pre-paging according to the SDL (Specification and Description Language) chart of a 3GPP improved protocol, and actually the processing is still performed according to call failure at this moment.

Therefore, the prior art only provides a solving method for the subscribers of high mobility in a non pre-paging scene, and processing is still performed according to call failure for the subscribers of pre-paging.

SUMMARY OF THE INVENTION

The technical problem to be solved in the present invention is to provide a method for roaming retry under pre-paging mode so as to avoid the problem of call failure that occurs when the location area of a subscriber changes during the pre-paging period.

In order to solve the above problem, the present invention provides a method for roaming retry under pre-paging mode, comprising:

during a pre-paging period, a called Mobile Station (MS) moving to a new location area and sending a location update request to a new Visitor Mobile Switching Center/Visitor Location Register (New VMSC/VLR);

after receiving the location update request, the New VMSC/VLR sending a update location area message to a Home Location Register (HLR);

after receiving the update location area message, the HLR sending a Send Routing Information (SRI) Ack message including a Roaming Retry Indication identifier to a to a Gateway Mobile Switching Center (GMSC); and after receiving the SRI Ack message, the GMSC triggering a roaming retry procedure according to the Roaming Retry Indication identifier in the SRI Ack message, and completing the subsequent calling flow.

Furthermore, the method may also have the following features: initiating of said pre-paging comprises: the GMSC sending a SRI message to the HLR; the HLR sending a Provide Roaming Number (PRN) message to an Old Visitor Mobile Switching Center/Visitor Location Register (Old VMSC/VLR); and the Old VMSC/VLR initiating a procedure of pre-paging.

Furthermore, the method may also have the following features: said SRI message and said PRN message include a roaming retry support identifier and a pre-paging support identifier.

Furthermore, the method may also have the following features: after receiving the update location area message, the HLR directly sends the SRI Ack message including the roaming retry indication identifier to the GMSC.

Furthermore, the method may also have the following features: after receiving the update location area message, the HLR sends a Cancel Location message to the Old VMSC/VLR;

the Old MSC/VLR judges whether the PRN message includes a roaming retry supported identifier or not, if yes, then the Old MSC/VLR intermits the procedure of pre-paging that is currently carried out and returns a PRN failure response message including the roaming retry indication identifier to the HLR; otherwise, the Old MSC/VLR returns a PRN Ack message including an error indication to the HLR;

after receiving the PRN failure response message, the HLR sends the SRI Ack message including the roaming retry indication identifier to the GMSC.

Furthermore, the method may also have the following features: after receiving the location update request, the New VMSC/VLR sends a message to the Old VMSC/VLR to indicate update of location area of a subscriber;

the Old MSC/VLR judges whether the PRN carries an roaming retry supported identifier or not, if yes, then the Old MSC/VLR intermits the procedure of pre-paging that is currently carried out and returns a PRN failure response message including the roaming retry indication identifier to the HLR; otherwise, the Old MSC/VLR returns a PRN Ack message including an error indication to the HLR;

after receiving the PRN failure response message, the HLR sends the SRI Ack message including the roaming retry indication identifier to the GMSC.

Furthermore, the method may also have the following features: when the GMSC determining that the SRI Ack message includes the roaming retry indication identifier, the GMSC sends a second SRI message to the HLR, and deletes the roaming retry supported identifier from the second SRI message.

Furthermore, the method may also have the following features: after receiving the second SRI message and determining that a procedure of location update of a current subscriber is over, the HLR sends a PRN message to the New VMSC/VLR; the New VMSC/VLR sends a Mobile Station Roaming Number to the GMSC through the HLR and completes the subsequent call flow.

Furthermore, the method may also have the following features: location update of the current subscriber is considered to have been completed after the HLR sends a location area update response to the New VMSC/VLR.

Furthermore, the method may also have the following features: if the procedure of location update of the current subscriber has not been completely finished yet when the New VMSC/VLR receives the PRN message, then deletion of wireless resource connection is postponed until call termination processing is completed after the procedure of location update of the subscriber is ended.

Compared with the prior art, the method of the present invention solves the problem of pre-paging failure that occurs when the called subscriber roams out of the local location area during pre-paging by adding a roaming retry indication field in the responses of the SRI and PRN messages to instruct the GMSC to trigger a procedure of roaming retry in a case where pre-paging fails to obtain the roaming number. In the present method, a procedure of roaming retry can be triggered in a case of pre-paging failure of a subscriber without any additional messages such as a RCH message, thus facilitating reduction of the times of message flow interactions and efficiently avoiding the problem of sequence control of SRI ACK and RCH at the GMSC side caused by use of RCH.

PREFERRED EMBODIMENTS OF THE INVENTION

The content about roaming retry in the current 3GPP protocol is still blank. This portion is supplemented in CR (Change Request, a request for 3GPP protocol organization to amend protocols) of CP-070328, but the CR does not thoroughly solve all the problems, for example CR does not solve the problem of call failure that occurs when the subscriber moves into another location area before a response is made to the paging in a pre-paging scenario, and the original processing means, i.e. call failure, of 23.018 protocol of 3GPP is still followed.

In the present invention, a special identifier field of roaming retry indication (e.g., the Roaming Retry Indication field hereinafter) is added into the response messages of Provide Roaming Number (PRN) message and Send Routing Information (SRI) message to indicate that the current pre-paging fails because the subscriber moves into another location area, for which roaming retry is indicted, rather than because the radio signals of the subscriber are too weak; if pre-paging fails because the subscriber moves into another location area, then a GMSC triggers a procedure of reselecting routing, and reselection of routing will succeed since the HLR has received a new location update request of the subscriber at this moment.

Based on the above inventive idea, the method for roaming retry under pre-paging mode of the present invention comprises the following steps of:

A: during a pre-paging period, a called Mobile Station (MS) moving to a new location area and sending a location update request to a new Visitor Mobile Switching Center/Visitor Location Register (New VMSC/VLR)

B: the New VMSC/VLR sending an update location area message to a Home Location Register (HLR);

C: the HLR sending a Send Routing Information (SRI) Ack message carrying a Roaming Retry Indication identifier to a to a GMSC;

D: the GMSC triggering a roaming retry procedure, and completing the subsequent calling flow.

Figure 1:
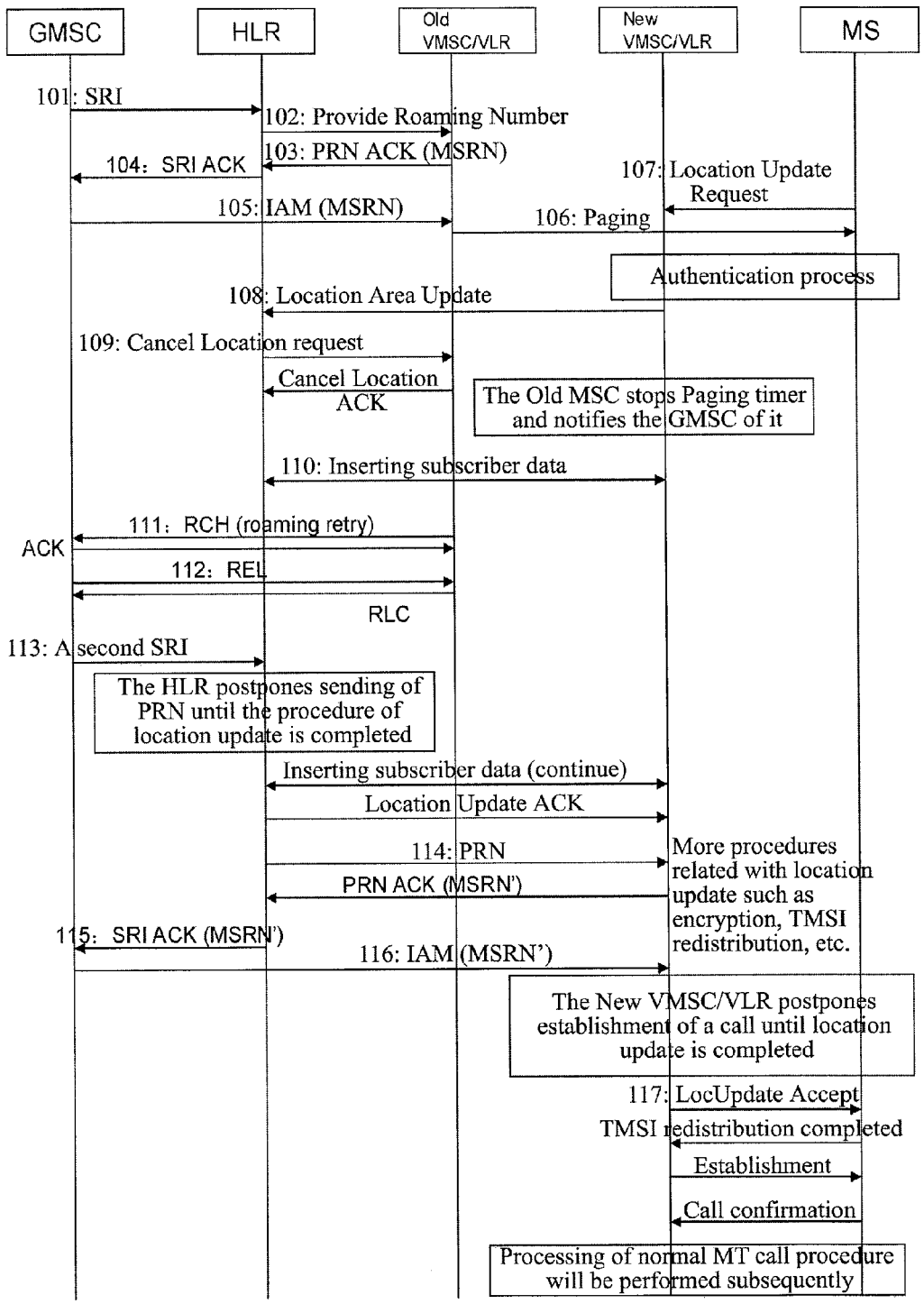
FIG. 1 is a flow of messages in the existing roaming retry technique.
Figure 2:
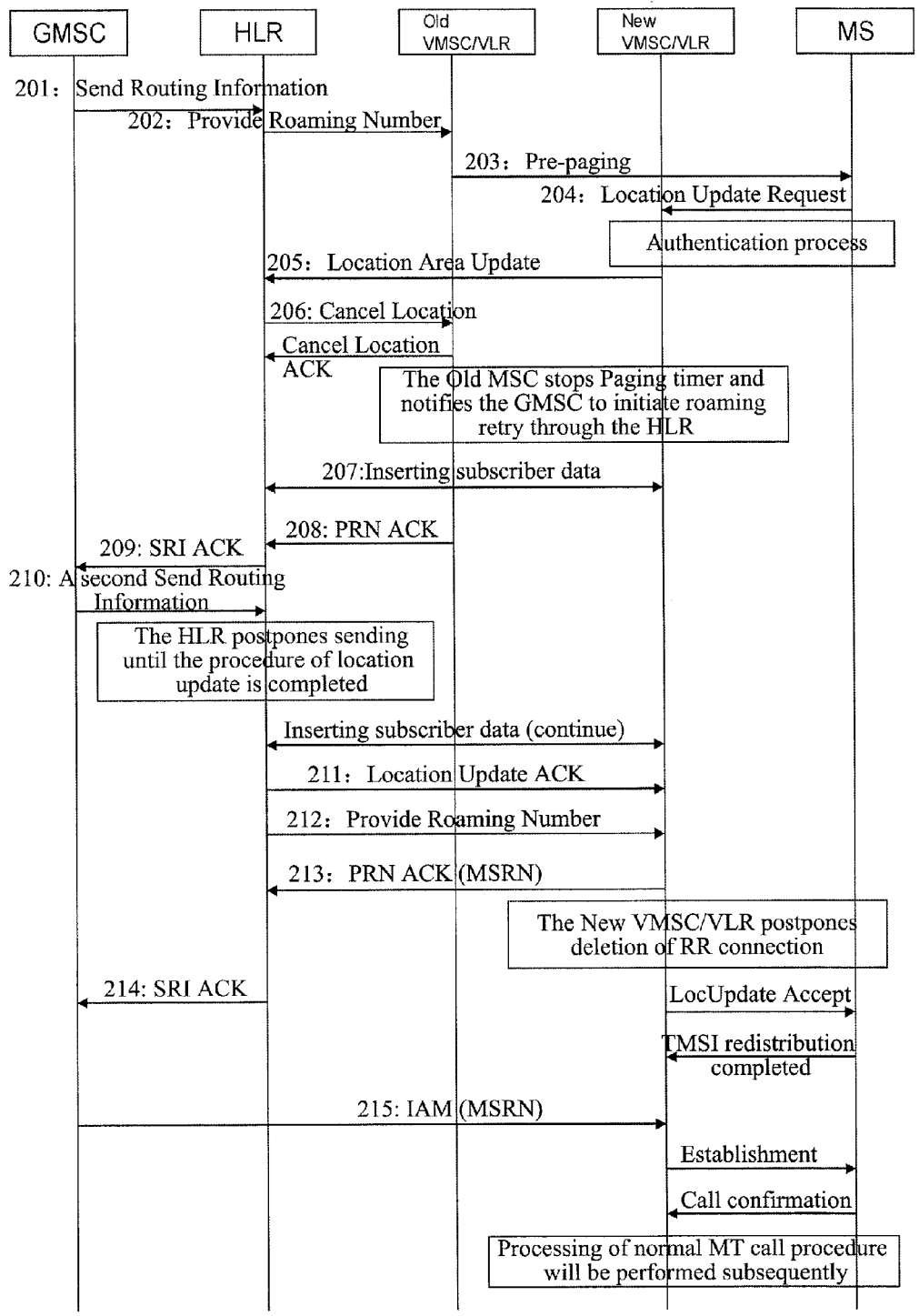
FIG. 2 illustrates the flow of triggering roaming retry under pre-paging scenario according to the present invention.

The present invention will be further described in detail below with reference to FIG. 2 and specific embodiments.

The method for roaming retry under pre-paging mode of the present invention comprises:

Step 201: a GMSC sending a Send Routing Information (SRI) message, carrying a Roaming Retry Support unit in the message to indicate that the GMSC supports Roaming Retry function and carrying a Pre-paging supported indication;

Step 202: the HLR sending a Provide Roaming Number (PRN) message to the Old VMSC/VLR, also carrying a Roaming Retry Support unit in the message to indicate that the both the HLR and GMSC support Roaming Retry function, and carrying a Pre-paging supported indication;

VMSC/VLR means that a VMSC and a VLR are installed together. These two devices are generally disposed together with an interface therebetween, and generally it is not necessary to describe the messages between them.

Step 203: the Old VMSC/VLR initiating a procedure of pre-paging;

Whether pre-paging is allowed can be configured; if pre-paging is allowed, it will be confirmed whether the called subscriber can be paged through the procedure of pre-paging triggered by the PRN message before the call reaches the VMSC where the called subscriber is located, and if the called subscriber can't be paged, it is unnecessary to establish the call to the VMSC; while if the called subscriber can be paged, then the call will be connected to the VMSC; some operators opens the function of pre-paging just because pre-paging can bring along certain benefits.

Step 204: the MS moving into another New MSC/VLR during the period of pre-paging, and initiating a new procedure of Update Location by sending a location update request to the New MSC/VLR;

Step 205: the New MSC/VLR sending an Update Location message to the HLR to initiate the procedure of location update;

Step 206: the HLR sending a Cancel Location message to the Old VMSC/VLR, at which time the Old MSC/VLR is performing pre-paging and the pre-paging timer has not timed out; the Old MSC/VLR stopping the procedure of pre-paging that is currently performed upon judging that a Cancel Location message is received during the period of pre-paging; and triggering step 208;

Actually since the timer of paging for a core network during the period of pre-paging can be as long as 9 seconds at most, in the time of which a subscriber of high mobility can move a distance of 100 meters, and a subscriber on the border of a location area may move from this location area to another location area in this distance of 100 meters. This may occur more likely in a city where base stations are very dense for coverage ranges and conditions of radio channels are very complex.

Step 207: the procedure of inserting subscriber data (Subscriber Data (multiple)) being carried out between the HLR and the New VMSC/VLR;

Step 206 and step 207 are not necessarily executed in sequence and they can also be performed in parallel.

Step 208: the Old VMSC/VLR returning a PRN ACK failure response message to the HLR, wherein the message includes a Roaming Retry Indication identifier for indicating that the VLR of the VMSC requires the GMSC to trigger Roaming Retry;

Step 209: upon receiving the PRN ACK message including a Roaming Retry Indication unit, the HLR converting the message to a SRI ACK message including a Roaming Retry Indication unit to indicate that the HLR requires the GMSC to trigger Roaming Retry;

Step 210: upon receiving the SRI ACK message including a Roaming Retry Indication unit, the GMSC triggering a procedure of Roaming Retry by sending a new SRI message without including Roaming Retry Support unit to the HLR to request for a roaming number again.

The SRI message sent out for the second time in roaming retry cannot carry Roaming Retry Supported field so as to avoid repetition of roaming retry. Generally speaking, the coverage range of each location area is very large, the message flows here are all proceeded very quickly within a second, during the time of which the subscriber will not move into a new location area, and roaming retry supports one retry at most, not allowing continuous retry.

Step 211/212: upon receiving the new SRI message and determining that the current subscriber is performing new location update, the HLR postponing sending of the PRN message until the procedure of new location update of the subscriber has been completed, then sending the corresponding PRN message to the new VMSC;

The location update of the subscriber is considered to have been completed if the HLR sends an Update Location Ack message to the New VMSC/VLR.

If the procedure of location update of the subscriber has not been completely finished when the New VMSC/VLR receives the PRN message (during which the call may arrive), then deletion of RR (Radio Resource) connection is postponed after location update of the subscriber ends until call termination processing is completed, and this RR connection can be used for call termination processing after an IAM message is received from the GMSC;

If the new paging still needs pre-paging but the procedure of new location update of the subscriber does not end, for example in the stage of TMSI (Temporary Mobile Subscriber Identity) redistribution, then the New MSC/VLR postpones release of RR connection until the new location update has been completed, which also saves the procedure of pre-paging; this RR connection can be used for initiating a call after the new call arrives.

After the subscriber enters the new location area, the HLR needs to perform location update (step 212), so as the New VMSC/VLR (step 215), including encryption and TMSI redistribution.

Step 213: the New VMSC/VLR returning a roaming number to the HLR;

Step 214: the HLR returning the roaming number to the GMSC;

Step 215: the GMSC sending an IAM message to the New VMSC/VLR using the new roaming number; the subsequent flow will proceed according to the flow of a normal call.

In the above flow, the processes of subscriber location update and the VLR returning the PRN RSP message including a Roaming Retry Indication field are as follows:

After the VLR of the VMSC receives the PRN message, if a Cancel Location message is received from the HLR during paging, then the VLR sends a Cancel Location indication to the VMSC via an interface between the VLR and the VMSC (paging is implemented by the VMSC), notifying the VMSC to intermit the procedure of paging, and the VLR returns a PRN RSP message including a Roaming Retry Indication field to the HLR.

The following flow can also be used to trigger the VLR to return a PRN RSP message including a Roaming Retry Indication field to the HLR: after the VLR of the VMSC receives a PRN message, if a MAP_SEND_IDENTIFICATION message is received from the New VMSC during the procedure of paging, then the VLR sends a Send Identification indication to the VMSC, notifying it to intermit the procedure of paging, and the VLR returns a PRN RSP message carrying Roaming Retry Indication field.

Of course, if paging times out or paging fails after the VLR of the VMSC receives a PRN message, then a PRN RSP message without including Roaming Retry Indication field is returned to notify the HLR that roaming number acquisition fails, in which case, roaming retry is not triggered.

The above flow is a processing flow with tiny modification on the existing system apparatus, and the flow of the present invention can be simplified as follows if big modification is made on the HLR such that the HLR implements association processing between two different MAP sessions:

i.e., the HLR skips to step 209 directly after step 205, omitting the procedure of the HLR sending a Cancel Location to the Old VMSC/VLR and returning a PRN ACK message to the HLR; in other words, after receiving the Update Location from the new subscriber, the HLR directly returns a SRI ACK message including a Roaming Retry Indication unit and releases the MAP session between the HLR and the Old VMSC/VLR.

Figure 3:
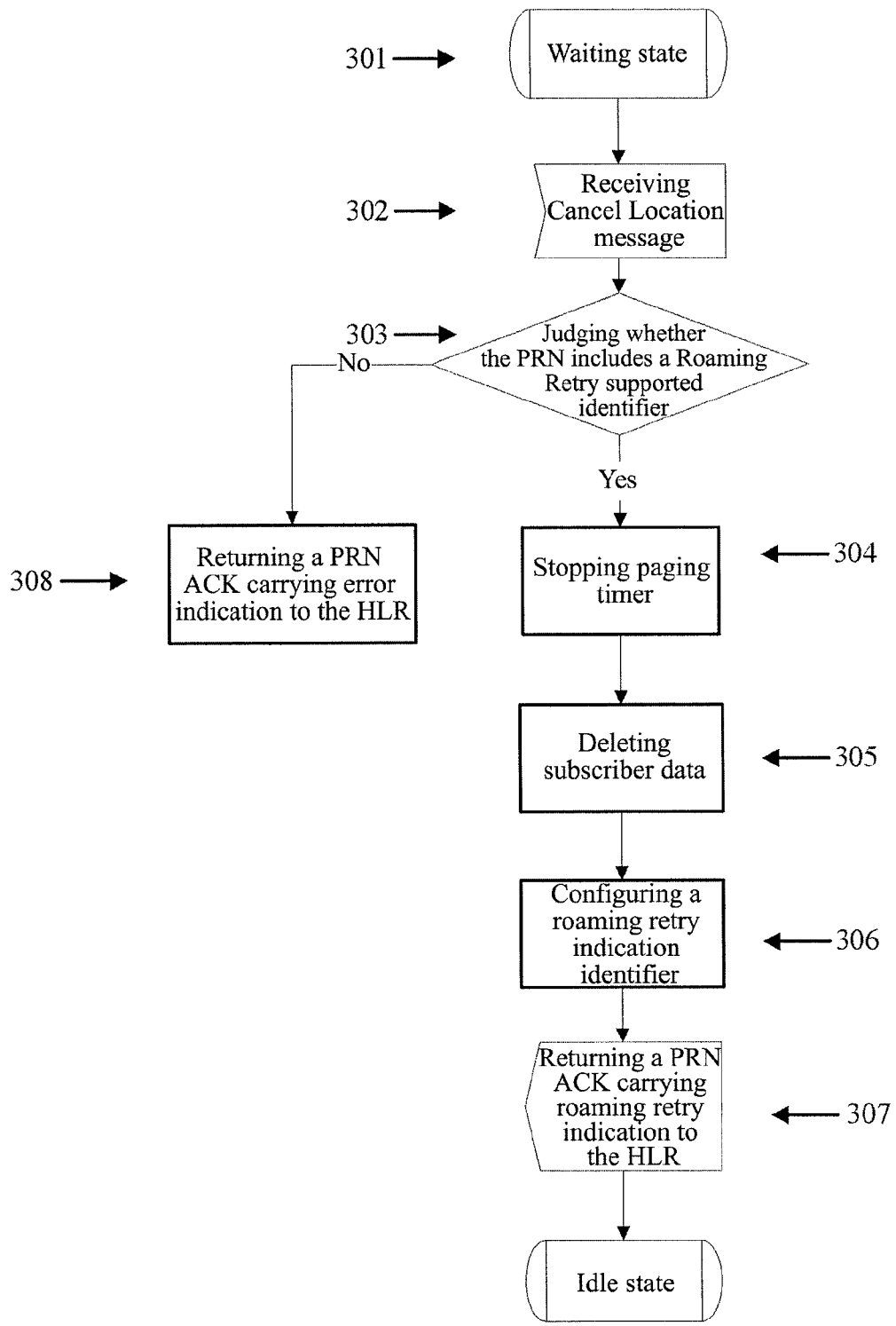
FIG. 3 illustrates the processing flow after VMSC/VLR receives a message of requesting for the roaming number according to the present invention.
Figure 4:
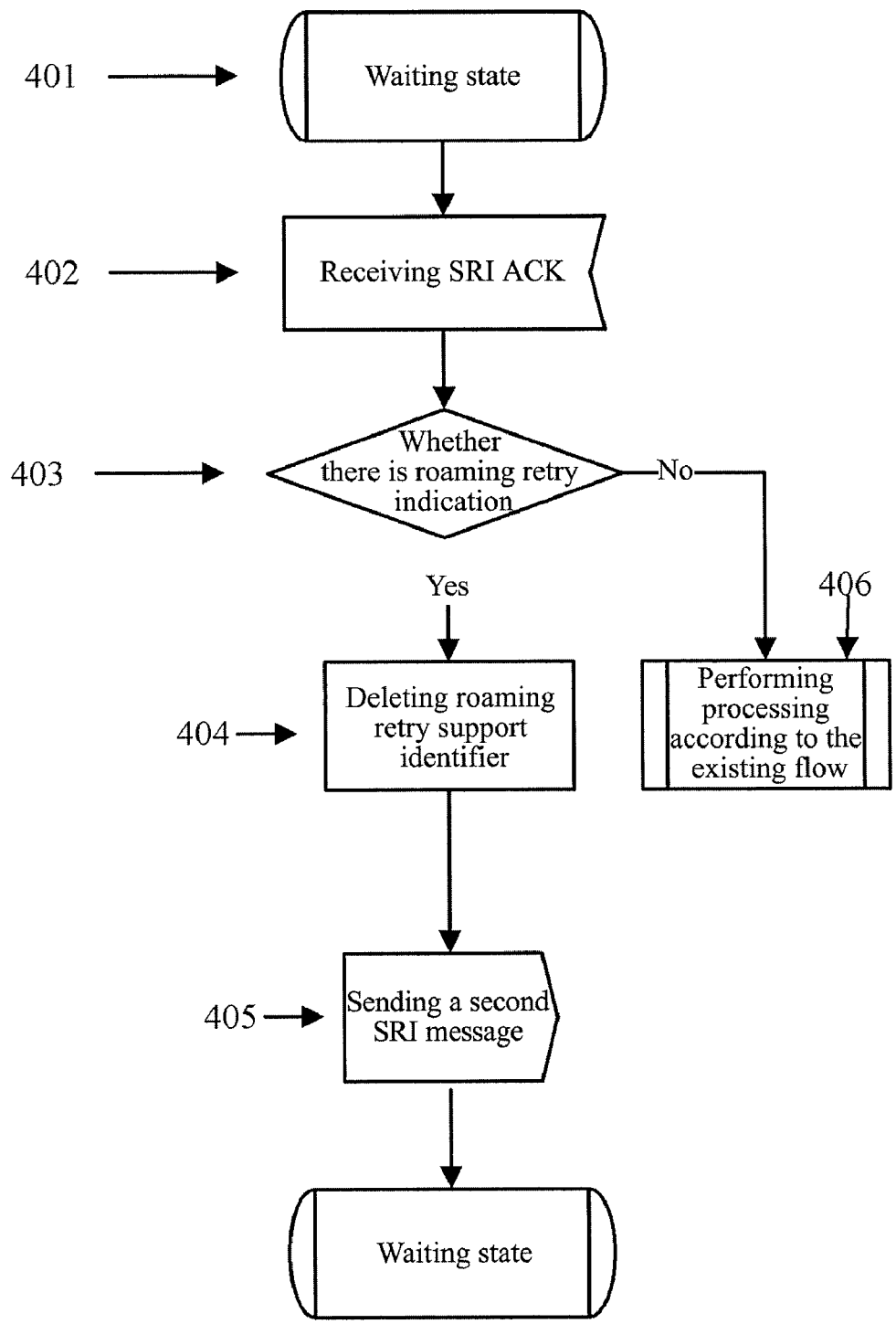
FIG. 4 illustrates the processing flow after a GSMC sends out a SRI message according to the present invention.

As shown in FIG. 3 and FIG. 4, which illustrate the processing flow after the Old VMSC/VLR receives a Cancel Location message and the processing flow after a GSMC sends out a SRI message respectively, detailed description will be made below with reference to the drawings.

FIG. 3 illustrates the processing after the Old VMSC/VLR receives a PRN message, wherein the paging timer is stopped and subscriber data are deleted, since no call will reach the local VMSC subsequently, if a Cancel Location message is received in this state and it is judged that the received PRN message includes a Roaming Retry Support identifier, and a PRN ACK is returned carrying a Roaming Retry Indication; this process comprises the following steps of:

Step 301: the Old VMSC/VLR implementing pre-paging upon receiving the PRN message, and being in a Wait_For_Access_Request state after sending out a paging message, waiting to process various messages in this state;

Step 302: receiving a Cancel Location message from the HLR;

Step 303: checking whether the PRN message received previously by the VLR includes a Roaming Retry Support identifier, if yes executing step 304, otherwise executing step 308;

Step 304: stopping the paging timer and stopping the procedure of paging;

Step 305: deleting subscribe data;

Step 306: configuring the Roaming Retry Indication field in the PRN ACK message;

Step 307: sending a PRN Ack message including error information and a Roaming Retry Indication field to the HLR, entering idle state, and ending the call processing of this time;

Roaming number acquisition actually fails at this moment, and the message is only responsible for triggering roaming retry and does not include the roaming number.

Step 308: returning a PRN Ack message carrying an error indication to the HLR.

FIG. 4 illustrates the processing flow after a GSMC sends out a SRI message, which describes the process of the GSMC obtaining the Routing Address, wherein after receiving a negative response, the GMSC firstly judges whether the message contains Roaming Retry Indication, if yes, it sends another SRI message that does not contain Roaming Retry Support to request for the roaming number again, and enters waiting state once more; the specific process comprises the following steps:

Step 401: the GMSC being in a waiting state (Wait For Routing Info) after sending a SRI message;

Step 402: receiving a failure response of the SRI message;

Step 403: judging whether the failure response of the SRI message includes a Roaming Retry Indication field, if yes, executing step 404, otherwise executing step 406:

Step 404: clearing the Roaming Retry Support filed in the second SRI message to be sent;

Step 405: sending again a SRI message not including Roaming Retry Support field; and transferring to Wait_For_Routing_Info state, continuing to wait for routing response;

Step 406: processing according to the existing flow, see 23.018 description of 3GPP.

In the method of the present invention, a GMSC is indicated to trigger a roaming retry procedure in a case where pre-paging fails to obtain the roaming number by adding a roaming retry indication identifier field in responses to the SRI and PRN messages prescribed in 29.002 protocol respectively, and the GMSC is controlled to implement roaming retry, thereby solving the problem of call failure that occurs when the called user roams out of the local location area during pre-paging. With the present method, a procedure of roaming retry can be triggered in a case of pre-paging failure of a subscriber without any additional messages such as a RCH message, thus facilitating reduction of the times of message flow interactions and efficiently avoiding the problem of sequence control of SRI ACK and RCH at the GMSC side caused by use of RCH.

In the method of the present invention, a subscriber can decide whether to start Roaming Retry through configuration; if the subscriber configures to start Roaming Retry, then the SRI message and the PRN message are allowed to include a Roaming Retry Support unit for indicating whether Roaming Retry function is supported; the subscriber can also decide whether to start PrePaging Roaming Retry through configuration; if the subscriber configures to start Paging Roaming Retry, then SRI ACK and PRN ACK message are allowed to carry a Roaming Retry Indication unit to indicate whether the GMSC is required to initiate Roaming Retry.

Industrial Applicability

The present invention perfects the CP-070328 of 3GPP, thereby solving the problem of Roaming Retry under pre-paging that is not solved in CP-070328 of 3GPP, completing the call flow for subscribers of high mobility, and increasing the probability of call success in the case where a subscriber of high mobility is at the border of a location area.

What we claim is:

1. A method for roaming retry under pre-paging mode, comprising:

during a pre-paging period, a called Mobile Station (MS) moving to a new location area and sending a location update request to a new Visitor Mobile Switching Center/Visitor Location Register (New VMSC/VLR);

after receiving the location update request, the New VMSC/VLR sending a update location area message to a Home Location Register (HLR);

after receiving the update location area message, the HLR sending a Send Routing Information (SRI) Ack message including a Roaming Retry Indication identifier to a Gateway Mobile Switching Center (GMSC); and after receiving the SRI Ack message, the GMSC triggering a roaming retry procedure according to the Roaming Retry Indication identifier in the SRI Ack message, and completing a subsequent calling flow.

2. The method according to claim 1, wherein initiating of said pre-paging comprises: the GMSC sending a SRI message to the HLR; the HLR sending a Provide Roaming Number (PRN) message to an Old Visitor Mobile Switching Center/Visitor Location Register (Old VMSC/VLR); and the Old VMSC/VLR initiating a procedure of pre-paging.

3. The method according to claim 2, wherein said SRI message and said PRN message include a roaming retry support identifier and a pre-paging support identifier.

4. The method according to claim 1, wherein after receiving the update location area message, the HLR directly sends the SRI Ack message including the roaming retry indication identifier to the GMSC.

5. The method according to claim 3, further comprising:
after receiving the update location area message, the HLR sending a Cancel Location message to the Old VMSC/VLR;
the Old MSC/VLR judging whether the PRN message includes a roaming retry supported identifier or not, if yes, then the Old MSC/VLR intermitting the procedure of pre-paging that is currently carried out and returning a PRN failure response message including the roaming retry indication identifier to the HLR; otherwise, the Old MSC/VLR returning a PRN Ack message including an error indication to the HLR;
after receiving the PRN failure response message, the HLR sending the SRI Ack message including the roaming retry indication identifier to the GMSC.

6. The method according to claim 3, further comprising:
after receiving the location update request, the New VMSC/VLR sending a message to the Old VMSC/VLR to indicate update of location area of a subscriber;
the Old MSC/VLR judging whether the PRN carries an roaming retry supported identifier or not, if yes, then the Old MSC/VLR intermitting the procedure of pre-paging that is currently carried out and returning a PRN failure response message including the roaming retry indication identifier to the HLR; otherwise, the Old MSC/VLR returning a PRN Ack message including an error indication to the HLR;
after receiving the PRN failure response message, the HLR sending the SRI Ack message including the roaming retry indication identifier to the GMSC.

7. The method according to claim 1, further comprising:
when the GMSC determining that the SRI Ack message includes the roaming retry indication identifier, the GMSC sending a second SRI message to the HLR, and deleting the roaming retry supported identifier from the second SRI message.

8. The method according to claim 7, further comprising:
after receiving the second SRI message and determining that a procedure of location update of a current subscriber is over, the HLR sending a PRN message to the New VMSC/VLR; the New VMSC/VLR sending a Mobile Station Roaming Number to the GMSC through the HLR and completing the subsequent call flow.

9. The method according to claim 8, wherein location update of the current subscriber is considered to have been completed after the HLR sends a location area update response to the New VMSC/VLR.

10. The method according to claim 8, further comprising:
if the procedure of location update of the current subscriber has not been completely finished yet when the New VMSC/VLR receives the PRN message, then postponing deletion of wireless resource connection until call termination processing is completed after the procedure of location update of the subscriber is ended.

11. The method according to claim 2, wherein after receiving the update location area message, the HLR directly sends the SRI Ack message including the roaming retry indication identifier to the GMSC.

12. The method according to claim 2, further comprising:
when the GMSC determining that the SRI Ack message includes the roaming retry indication identifier, the GMSC sending a second SRI message to the HLR, and deleting the roaming retry supported identifier from the second SRI message.

13. The method according to claim 12, further comprising:
after receiving the second SRI message and determining that a procedure of location update of a current subscriber is over, the HLR sending a PRN message to the New VMSC/VLR; the New VMSC/VLR sending a Mobile Station Roaming Number to the GMSC through the HLR and completing the subsequent call flow.

14. The method according to claim 13, wherein the location update of the current subscriber is considered to have been completed after the HLR sends a location area update response to the New VMSC/VLR.

15. The method according to claim 13, further comprising:
if the procedure of location update of the current subscriber has not been completely finished yet when the New VMSC/VLR receives the PRN message, then postponing deletion of wireless resource connection until call termination processing is completed after the procedure of location update of the subscriber is ended.

* * * * *